United States Patent [19]
Hedges

[11] 3,818,948
[45] June 25, 1974

[54] FLEXIBLE AND FOLDABLE CONDUIT
[75] Inventor: Lee Minor Hedges, Somerville, N.J.
[73] Assignee: Johns-Manville Corporation, New York, N.Y.
[22] Filed: July 18, 1972
[21] Appl. No.: 272,820

[52] U.S. Cl. ............................ 138/119, 138/137
[51] Int. Cl. ........................................ F16l 11/12
[58] Field of Search ...... 138/137, 138, DIG. 4, 177, 138/119, 128, 147

[56] References Cited
UNITED STATES PATENTS
789,315  5/1905  Bergstrom ........................ 138/119

Primary Examiner—Jerry W. Myracle
Attorney, Agent, or Firm—Robert M. Krone; John D. Lister

[57] ABSTRACT

A conduit of polygonal cross section has inner and outer flexible walls which are reinforced by a plurality of elongate stiffening means disposed intermediate the walls in axially spaced-apart planes oriented substantially perpendicular to the longitudinal axis of the conduit whereby the conduit is flexible and can be collapsed in an axial direction. Each of the stiffening means comprises a plurality of elongate stiffening elements which are equal in number to the number of sides of the conduit. These elongate stiffening elements are capable of angular movement relative to other of the elongate stiffening elements in the same plane wherein the conduit can be folded or collapsed until it is essentially flat.

3 Claims, 5 Drawing Figures

PATENTED JUN 25 1974  3,818,948
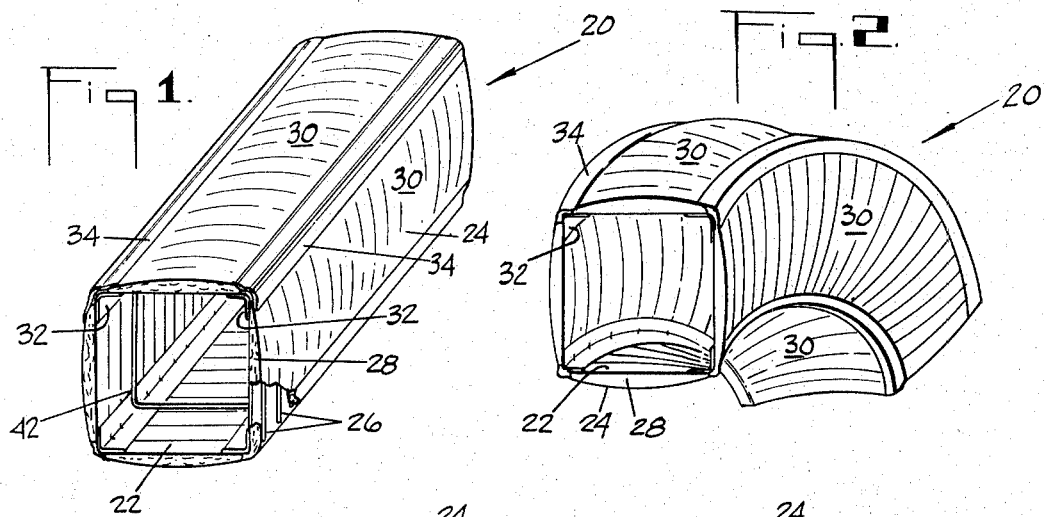
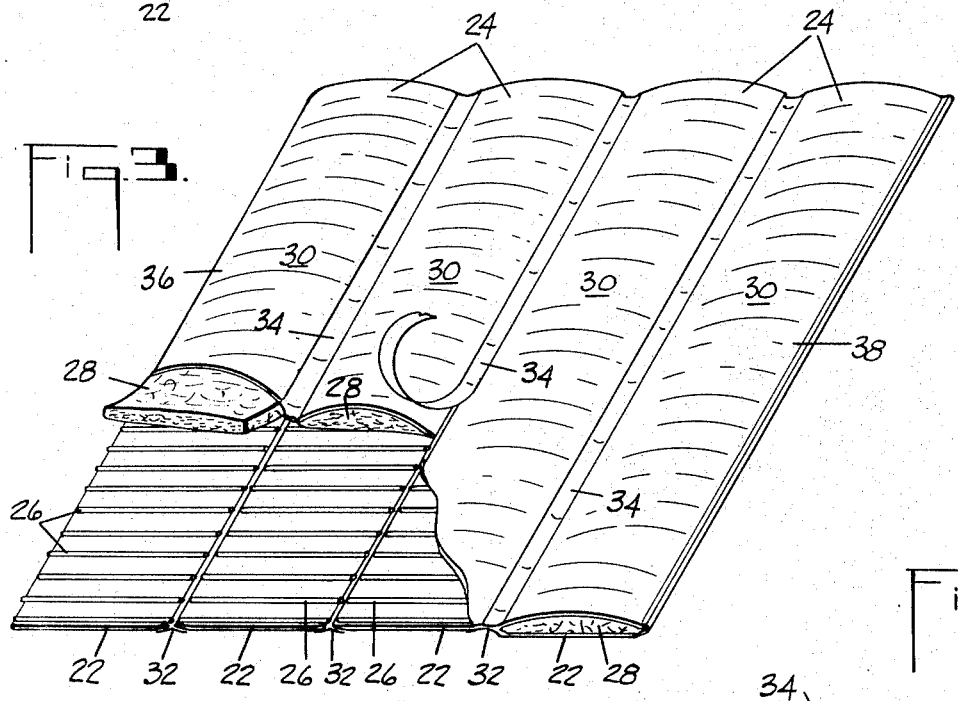
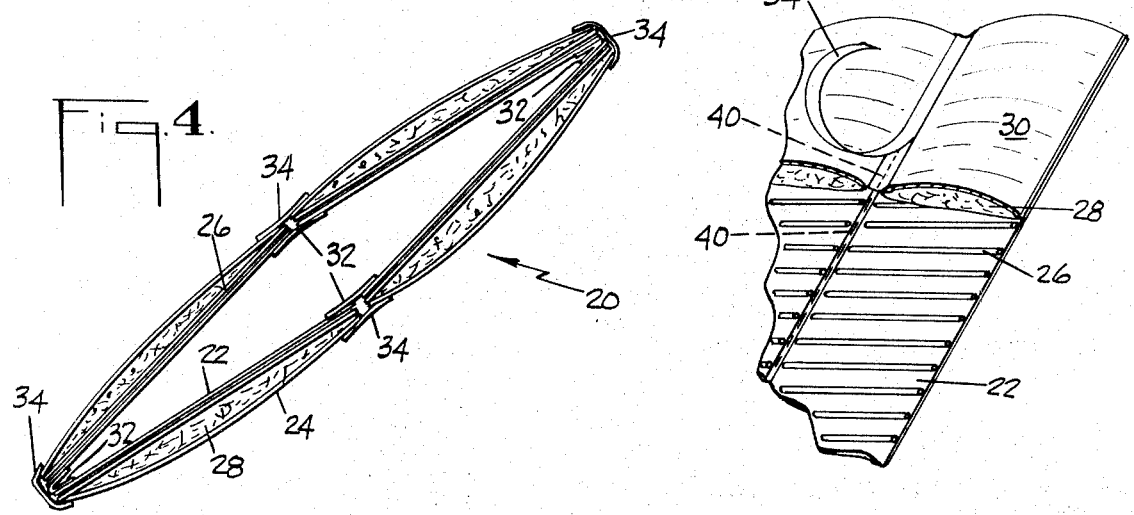

FLEXIBLE AND FOLDABLE CONDUIT

BACKGROUND OF THE INVENTION

This invention relates to flexible conduit and in particular to flexible duct connectors which can be folded until they are essentially flat in transverse cross section.

Existing sheet metal conduits and flexible conduits used for duct systems carrying heated or cooled air (e.g., air conditioning, heating and ventilating systems) are generally fabricated at a plant or shop and shipped in their bulky finished form to the job site. Thus there has been a need for conduit and preferably a flexible conduit which would eliminate the space, storage and transportation problems associated with the sheet metal conduit and flexible conduits of the prior art. The problem was at least partially solved in the developments disclosed in applicant's co-pending application Ser. No. 144,185 entitled FLUID CONDUIT, filed May 17, 1971 and applicant's application Ser. No. 203,764 entitled FLEXIBLE INSULATED CONDUIT AND METHOD OF MAKING THE SAME filed Dec. 1, 1971. These applications disclose a flexible conduit wherein the frame stock can be assembled in a factory, shipped to the job site in sheet form and readily fabricated at the job site into the desired shape for the installation.

SUMMARY OF THE INVENTION

The present invention is a different approach to the problem which eliminates the space, storage and transportation problems associated with the conduit of the prior art. In addition, it eliminates the on-site assembly operations associated with flexible conduit that is normally assembled from flat frame stock on the job. The present invention provides a means by which a flexible conduit can be assembled at a factory or shop and collapsed into an essentially flat form for shipment. This feature provides for ease of transportation, shipment and storage of the assembled conduits. In addition, the conduits can be easily removed from their carton in flat or folded form when needed and easily unfolded or opened into the intended polygonal cross section. The duct is then ready to be installed in the duct system with no initial assembly operation required. While these conduits can be used in other locations due to their flexibility, these conduits are well suited as connectors (e.g., elbows and other angular fittings) for duct systems.

The present invention is directed to a flexible conduit comprising inner and outer flexible walls with the inner wall defining an enclosed passage of polygonal cross section and the outer wall defining an external surface of polygonal cross section. A plurality of elongate stiffening means are disposed intermediate and secured to at least one of the walls in axially spaced apart planes oriented substantially perpendicular to the longitudinal axis of the conduit. In this manner, the stiffening means are joined by the inner and outer flexible walls and the conduit can be collapsed in an axial direction twisted or otherwise formed into the required shape. Each of the stiffening means comprises a plurality of elongate stiffening elements equal in number to the number of sides of the polygonal cross section. Each of these elongate stiffening elements can be angularly moved relative to other of the elongate stiffening elements in its plane thereby allowing the conduit to be collapsed or folded until it is substantially flat in transverse cross section.

BRIEF DESCRIPTION OF THE DRAWINGS

FIG. 1 is a perspective view, with a portion broken away, of a typical flexible and collapsable conduit of the present invention;

FIG. 2 is a perspective view of a typical flexible and foldable conduit of the present invention employed as an elbow connector;

FIG. 3 is a perspective view, with portions broken away, of a partially assembled conduit of the present invention;

FIG. 4 is an end view of a conduit of the present invention which has been partially collapsed; and FIG. 5 is a fragmentary perspective view of a modified form of the present invention which is only partially assembled.

DESCRIPTION OF THE PREFERRED EMBODIMENTS

FIGS. 1 and 2 of the drawings illustrate the conduit of the present invention which is designated by reference character 20. Each sidewall of the conduit comprises an inner facing sheet 22, an outer facing sheet 24 and elongate reinforcing elements 26. In addition, an insulating blanket 28 is generally sandwiched between the inner and outer facing sheets 22 and 24. The sidewalls are joined together by inner and outer tapes 32 and 34 respectively to form the corners of the conduit.

The facing sheets 22 and 24 are flexible, fluid impervious sheets which are coated on their opposing surfaces with a pressure sensitive or a heat setting adhesive. Presently, heat setting adhesives are preferred due to their fire resistant properties. Materials for the facing sheets include a cloth backing laminated to a polyethylene film and a MYLAR (Trademark of du Pont) film with a glass scrim reinforcement. Although these materials have been found to be satisfactory, it is contemplated that other materials can also be utilized for the facing sheets 22 and 24. Furthermore, while commercially available pressure sensitive and heat setting adhesives (e.g., uncured neoprene) have been employed with success, it is contemplated that other types of adhesives can also be utilized.

The sitffening elements 26 are generally bonded to the inner facing sheet 22 is spaced apart parallel relationship. The spacing of the stiffening elements depends on the degree of reinforcement required and the gauge of the wire utilized. However, spacings of approximately one inch have proved satisfactory. The reinforcing elements are bonded or fixed to the facing sheet 22 so that they permanently retain their relative positions on the facing sheet during formation of the conduit and later flexing and/or twisting of the conduit 20.

The layer 28 of insulation is bonded to both facing sheets and surrounds the stiffening elements 26 on three sides. With this construction, the insulation is firmly adhered to the facing sheets and is securely retained in position during formation of the conduit and later flexing and/or twisting of the conduit 20. The insulating layer 28 can be a blanket of glass fiber insulation or any other suitable insulating material. However, the insulating layer 28 should be capable of recovering from compression without undue fiber breakage or significant losses in the insulating properties. The type of insulation used and its thickness will depend on the insulating requirements of the intended use.

The tapes 32 and 34 are also made of flexible fluid impermeable material such as those utilized for the facing sheets 22 and 24 or conventional duct closure tape and utilize a suitable commercially available pressure sensitive or heat setting adhesive.

One method of assembling the conduit is to form a piece of frame stock having the desired length for the conduit and a width substantially equal to the peripheral distance about the conduit. As shown in FIG. 3, the frame stock comprises the facing sheets 22 and 24 with the elongate stiffening elements 26 adhesively bonded to facing sheet 22 in spaced apart parallel relationship at right angles to the longitudinal center line of the frame stock. The insulating blanket 28 is adhesively bonded to both facing sheet 22 and facing sheet 24. Of course, if the duct is not to be insulated, the insulating blanket 28 is eliminated and the reinforcing elements 26 are bonded to both facing sheets.

The first step involved in forming the conduit from the frame stock involves cutting and completely severing the frame stock longitudinally into the required number of strips or sections 30 which are to form the side walls of the conduit. The widths of the sections correspond to the required width of the conduit side walls. After the sections 30 have been cut from the frame stock, the longitudinal edges of the sections are joined by the tapes 32 and 34 which are secured to the facing sheets 22 and 24 respectively. After all but one of the corner joints have been formed as shown in FIG. 3, the last corner joint is formed by folding over the free edges 36 and 38 of the outermost sections 30 until they are adjacent each other. Once these edges are adjacent each other, adhesive strips 32 and 34 are applied to the interior and exterior of the edges 36 and 38 to complete the formation of the conduit. With the formation of this final corner joint, the assembly of the conduit is now complete.

The conduit 20 is reinforced by the elongate reinforcing elements 26 which lie in planes oriented at right angles to the longitudinal center line of the conduit 20. Due to the axial spacing between adjacent stiffening elements 26 the conduit can be axially collapsed, twisted or flexed as shown in FIG. 2. Due to the discontinuous nature of the reinforcing elements 26 at the corners of the conduit and the flexible tapes 32 and 34 utilized to join the side walls of the conduit, the conduit 20 can be collapsed or folded into an essentially flat, transverse configuration. FIG. 4 shows the conduit in a partially collapsed state.

FIG. 5 illustrates a second embodiment of the present invention in a partially assembled state. In this embodiment instead of completely severing the frame stock at what will become the corners of the conduit 20, the frame stock is only severed at the reinforcing elements 26 creating spread apart slits 40 and thereby leaving the frame stock intact. In this manner, the portions of the facing sheets 22 and 24 located intermediate the elongate reinforcing elements are not severed at the corners and further strengthen the corner joints. Of course, the tapes 32 and 34 are applied to the corner joints to assure that the corners are fluid tight and to further strengthen the corner joints. With this one exception in the design, the second embodiment of the present invention is identical in consturction to the first embodiment.

If desired, wire staples can be applied through one of the tapes and one of the facings then around the grid wires to achieve a mechanical attachment. This is especially true for the last joint or seam where the fabric facing as well as the grid wires are discontinuous for both embodiments.

In the event that more corner rigidity is needed or desired in the assembled and installed connector, one or more wire hoops 42 shaped to conform to the cross section of the conduit 20 can be inserted within the conduit. The wire hoops are of such a size that the hoops form an interference or force fit with the inside of the conduit. These hoops are fitted inside the connector just prior to installation.

What is claimed is:

1. A flexible conduit comprising:
   a. inner and outer flexible walls, at least one of said walls being fluid impermeable, said inner wall defining an enclosed passage of polygonal cross section, said outer wall defining an external surface of the polygonal cross section,
   b. insulation disposed intermediate said inner and outer walls,
   c. a plurality of elongate stiffening means disposed intermediate said walls, said stiffening means lying in axially spaced-apart planes oriented substantially perpendicular to the longitudibal axis of the conduit, said stiffening means being adhesively secured to one of said walls in said axially spaced-apart planes whereby said conduit can be collapsed in an axial direction, each of said stiffening means comprising a plurality of separate elongate stiffening rod elements equal in number to the number of conduit sides and each of said elongate stiffening elements being capable of angular movement relative to other of said elongate stiffening elements in its plane wherein said conduit can be collapsed until said conduit is substantially flat in transverse cross section.

2. The flexible conduit of claim 1 wherein the sides of the conduit are joined at the corners of the conduit by flexible adhesive tape.

3. The flexible conduit of claim 1 wherein a wire hoop corresponding in cross section to the enclosed passage of the conduit is located within the passage of the conduit.

* * * * *